(12) United States Patent
Liu et al.

(10) Patent No.: US 11,101,684 B2
(45) Date of Patent: Aug. 24, 2021

(54) DUAL INPUT POWER SUPPLY WITH SHORTENED SWITCHING

(71) Applicant: Merry Electronics(Shenzhen) Co., Ltd., ShenZhen (CN)

(72) Inventors: Yung-Hsiang Liu, Taichung (TW); Wei-Kang Liang, Taichung (TW); Yu-Kai Wang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 119 days.

(21) Appl. No.: 16/563,964

(22) Filed: Sep. 9, 2019

(65) Prior Publication Data

US 2020/0244098 A1    Jul. 30, 2020

Related U.S. Application Data

(60) Provisional application No. 62/796,592, filed on Jan. 25, 2019.

(30) Foreign Application Priority Data

Jun. 11, 2019   (TW) ................................. 108120098

(51) Int. Cl.
   *H02J 9/06*       (2006.01)
   *H02M 7/44*       (2006.01)
(52) U.S. Cl.
   CPC .............. *H02J 9/061* (2013.01); *H02M 7/44* (2013.01)

(58) Field of Classification Search
   CPC ................................... H02J 9/061; H02M 7/44
   USPC ........................................................... 307/64
   See application file for complete search history.

(56) References Cited

U.S. PATENT DOCUMENTS

| 10,565,073 | B2 * | 2/2020 | Lee ......................... G06F 1/30 |
| 2013/0106190 | A1 | 5/2013 | Lin et al. |
| 2015/0303688 | A1 * | 10/2015 | Tsai ....................... H02J 1/102 |
| | | | 307/64 |
| 2016/0373017 | A1 * | 12/2016 | Mima ...................... H02J 9/06 |

OTHER PUBLICATIONS

Joos et al. An On-line UPS with Improved Input-output characteristics, Feb. 1992, IEEE (Year: 1992).*

* cited by examiner

*Primary Examiner* — Michael R. Fin
(74) *Attorney, Agent, or Firm* — JCIPRNET (57) ABSTRACT

A power supply method and a power supply apparatus including a power conversion circuit, a first and a second switching circuit, and a control circuit are provided. The power conversion circuit is coupled between a DC power source and a power supply terminal and performs a boosting operation according to a DC voltage of the DC power source to generate a boost voltage. The first switching circuit is coupled between an AC power source and the power supply terminal. The second switching circuit is coupled between the power conversion circuit and the power supply terminal. The control circuit enters a first mode after turning on the first and the second switching circuit, so the first switching circuit transmits a main AC voltage of the AC power source to the power supply terminal in the first mode. The boost voltage is greater than a peak value of the main AC voltage.

14 Claims, 8 Drawing Sheets

DUAL INPUT POWER SUPPLY WITH SHORTENED SWITCHING

CROSS-REFERENCE TO RELATED APPLICATION

This application claims the priority benefits of U.S. provisional application Ser. No. 62/796,592, filed on Jan. 25, 2019, and Taiwan application serial no. 108120098, filed on Jun. 11, 2019. The entirety of each of the above-mentioned patent applications is hereby incorporated by reference herein and made a part of this specification.

BACKGROUND

Technical Field

The disclosure relates to a power supply technology, and more particularly to a power supply apparatus having a power source automatic switching function.

Description of Related Art

In order to ensure a stable operation of electrical equipment, a power supply apparatus with dual input power sources is usually used to supply power to the electrical equipment. A power supply apparatus with dual input power sources usually has an automatic transfer switch (ATS) that automatically switches the power supply source of the electrical equipment from the main input power source to the backup input power source when the main input power source is abnormal so as to prevent the electrical equipment from failing to operate due to power supply interruption, thereby improving the reliability of the electrical equipment.

However, when the main input power source is abnormal, if the switching time of the power supply source of the electrical equipment for switching from the main input power source to the backup input power source is too long, the electrical equipment may fail to operate normally due to temporary interruption of the power supply. Therefore, how to shorten the power switching time of the power supply apparatus is one of the major issues that persons skilled in the art intend to solve.

SUMMARY

In view of the above, the disclosure provides a power supply apparatus and a power supply method, which can shorten the power switching time of the power supply apparatus.

A power supply apparatus according to the disclosure includes a power conversion circuit, a first switching circuit, a second switching circuit, and a control circuit. The power conversion circuit is coupled between a DC power source and a power supply terminal and is configured to perform a boosting operation according to a DC voltage of the DC power source to generate a boost voltage. The first switching circuit is coupled between an AC power source and the power supply terminal. The second switching circuit is coupled between the power conversion circuit and the power supply terminal. The control circuit is coupled to the power conversion circuit, the first switching circuit and the second switching circuit. The control circuit enters a first mode after turning on the first switching circuit and the second switching circuit, so that the first switching circuit transmits a main AC voltage of the AC power source to the power supply terminal in the first mode, wherein a voltage value of the boost voltage is greater than a peak value of the main AC voltage.

In an embodiment of the disclosure, the control circuit determines whether the AC power source is abnormal in the first mode. If the AC power source is abnormal, the control circuit turns off the first switching circuit, and the control circuit controls the power conversion circuit to convert the boost voltage to a backup AC voltage and enters a second mode, so that the power conversion circuit outputs the backup AC voltage to the power supply terminal in the second mode.

A power supply method according to the disclosure includes the following steps: performing, by a power conversion circuit, a boosting operation according to a DC voltage of a DC power source to generate a boost voltage; turning on, by a control circuit, a first switching circuit coupled between an AC power source and a power supply terminal; after the first switching circuit is turned on, turning on, by the control circuit, a second switching circuit coupled between the power conversion circuit and the power supply terminal and entering a first mode; and in the first mode, transmitting, by the first switching circuit, a main AC voltage of the AC power source to the power supply terminal, wherein a voltage value of the boost voltage is greater than a peak value of the main AC voltage.

Based on the above, in the power supply apparatus and the power supply method proposed by the disclosure, before the control circuit enters the first mode, the power conversion circuit generates the boost voltage in advance according to the DC voltage of the DC power source. In this way, when the AC power source is abnormal, the control circuit only needs to turn off the first switching circuit and causes the power conversion circuit to convert the boost voltage to the backup AC voltage, and then the backup AC voltage can be output to the power supply terminal. Therefore, the switching time of the power supply source of the power supply terminal for switching from the AC power source to the DC power source can be shortened.

In order to make the aforementioned features and advantages of the disclosure comprehensible, embodiments accompanied with drawings are described in detail below.

DESCRIPTION OF THE EMBODIMENTS

In order to make the content of the disclosure easier to understand, embodiments are illustrated below as examples of the actual implementation of the disclosure. In addition, wherever possible, the drawings and the embodiments use elements/components/steps with the same reference numerals, which represent the same or similar parts.

Figure 1:
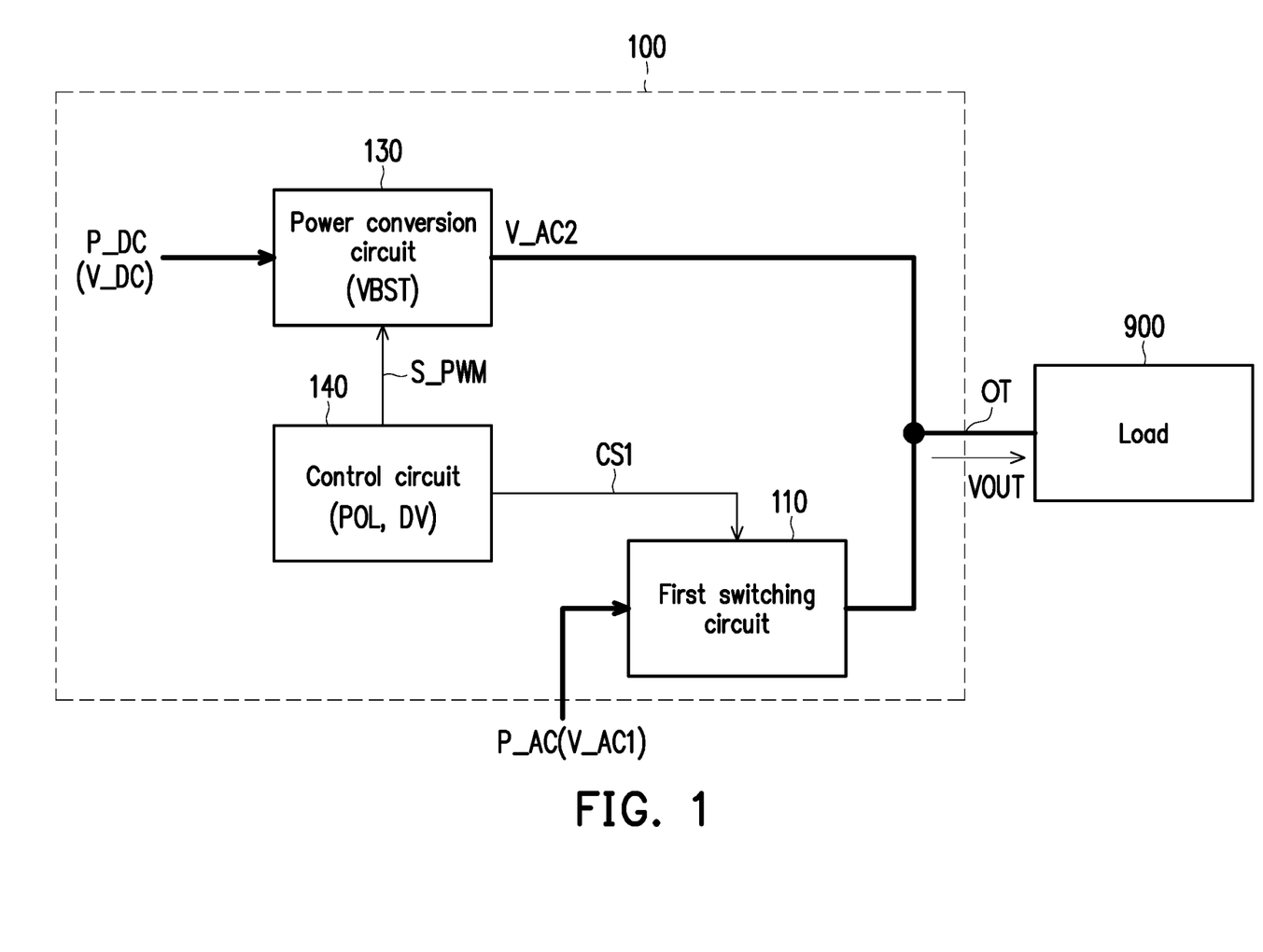
FIG. 1 is a schematic circuit block diagram of a power supply apparatus according to an embodiment of the disclosure.
Figure 2:
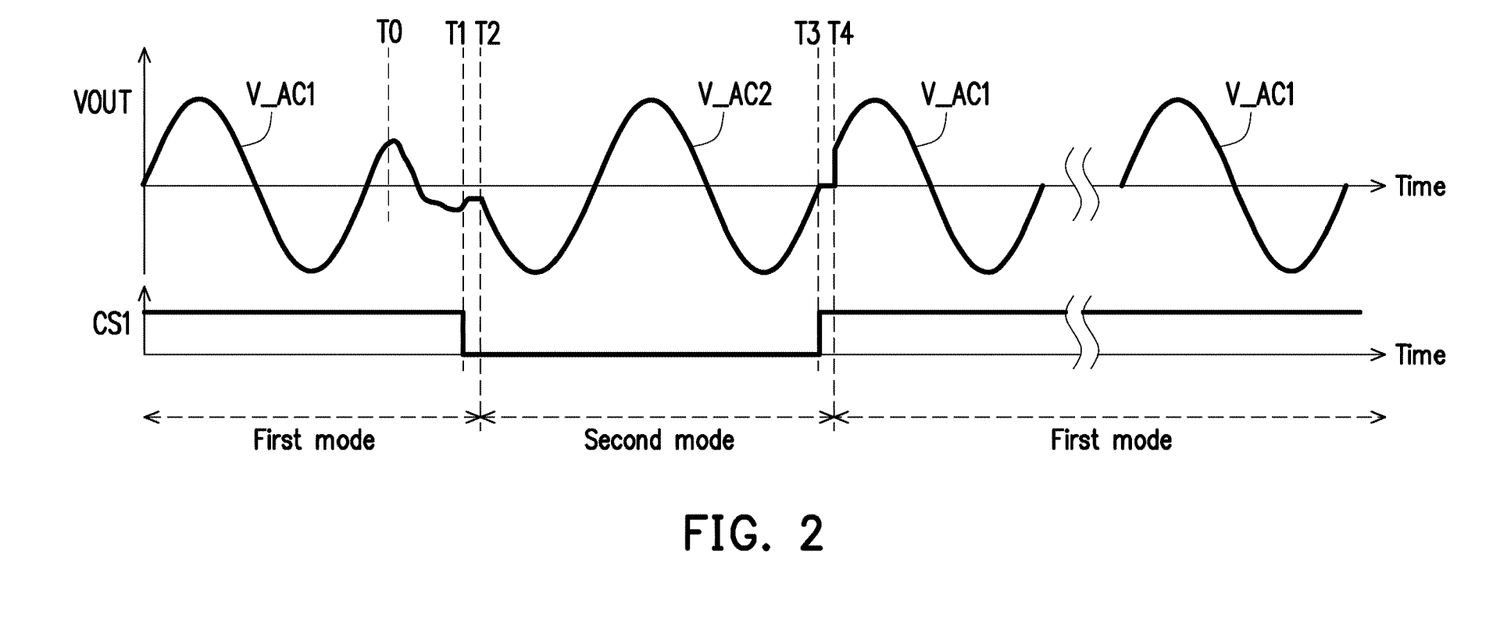
FIG. 2 is a schematic signal timing diagram of the power supply apparatus according to an embodiment of the disclosure.

FIG. 1 is a schematic circuit block diagram of a power supply apparatus 100 according to an embodiment of the disclosure, and FIG. 2 is a schematic signal timing diagram of the power supply apparatus 100 according to an embodiment of the disclosure. With reference to FIG. 1 and FIG. 2 together, a power supply terminal OT of the power supply apparatus 100 is configured to be coupled to a load 900. The power supply apparatus 100 can provide an output voltage VOUT through the power supply terminal OT to supply power to the load 900. In detail, the power supply apparatus 100 may include a first switching circuit 110, a power conversion circuit 130, and a control circuit 140. The first switching circuit 110 is coupled between an AC power source P_AC and the power supply terminal OT. The power conversion circuit 130 is coupled between a DC power source P_DC and the power supply terminal OT and is configured to perform a boosting operation according to a DC voltage V_DC of the DC power source P_DC to generate a boost voltage VBST.

The control circuit 140 is coupled to the first switching circuit 110 and the power conversion circuit 130. The control circuit 140 is configured to generate a first switching signal CS1 to control the turning on and turning off of the first switching circuit 110. The control circuit 140 enters a first mode after turning on the first switching circuit 110, so the first switching circuit 110 transmits a main AC voltage V_AC1 of the AC power source P_AC to the power supply terminal OT as the output voltage VOUT in the first mode. In addition, a voltage value of the boost voltage VBST is greater than a peak value of the main AC voltage V_AC1 to prevent the current of the AC power source P_AC from flowing into the power conversion circuit 130 through the first switching circuit 110.

In an embodiment of the disclosure, the AC power source P_AC may be, for example, an AC power source from a city power system, but the disclosure is not limited thereto.

In an embodiment of the disclosure, the first switching circuit 110 may be implemented with a power transistor, but the disclosure is not limited thereto. In other embodiments of the disclosure, the first switching circuit 110 may also be implemented with other known power switches.

In an embodiment of the disclosure, the power conversion circuit 130 may be implemented with a DC to AC converter having a DC boosting function, but the disclosure is not limited thereto.

In an embodiment of the disclosure, the control circuit 140 may be implemented with an application specific integrated circuit (ASIC), a field programmable gate array (FPGA) chip, a complex programmable logic device (CPLD), a micro-processor, a micro-controller, or other similar circuit elements, but it is not limited thereto.

In an embodiment of the disclosure, the control circuit 140 determines whether the AC power source P_AC is abnormal in the first mode. If the control circuit 140 determines that the AC power source P_AC is abnormal, the control circuit 140 turns off the first switching circuit 110 to stop transmitting the main AC voltage V_AC1 to the power supply terminal OT, and the control circuit 140 controls the power conversion circuit 130 to convert the boost voltage VBST to a backup AC voltage V_AC2 and enters a second mode, so that the power conversion circuit 130 outputs the backup AC voltage V_AC2 to the power supply terminal OT to supply power to the load 900 in the second mode.

For example, in the first mode shown in FIG. 2, the AC power source P_AC starts being abnormal at the time point T0, and the control circuit 140 determines at the time point T1 that the AC power source P_AC does become abnormal according to the main AC voltage V_AC1. Therefore, the control circuit 140 switches the first switching signal CS1 from a logic high level to a logic low level at the time point T1, so that the first switching circuit 110 switches to the off state at the time point T2. In addition, the control circuit 140 generates a pulse width modulation signal group S_PWM to the power conversion circuit 130 at the time point T2, so that the power conversion circuit 130 converts the boost voltage VBST to the backup AC voltage V_AC2 according to the pulse width modulation signal group S_PWM and, at the time point T2, starts outputting the backup AC voltage V_AC2 as the output voltage VOUT, wherein the control circuit 140 enters the second mode at the time point T2.

Since the boost voltage VBST has been established in advance by the power conversion circuit 130 according to the DC voltage V_DC before the control circuit 140 enters the first mode, when the control circuit 140 determines that the AC power source P_AC is abnormal in the first mode, the control circuit 140 only needs to turn off the first switching circuit 110 and causes the power conversion circuit 130 to convert the boost voltage VBST to the backup AC voltage V_AC2, and then the backup AC voltage V_AC2 can be directly output to the power supply terminal OT to supply power to the load 900. In this way, the switching time of the power supply source of the load 900 for switching from the AC power source P_AC to the DC power source P_DC can be shortened, thereby preventing the load 900 from failing to operate normally due to temporary interruption of the power supply.

In an embodiment of the disclosure, in the first mode, the control circuit 140 may record a voltage polarity and a voltage value of the power supply terminal OT to obtain a detected voltage polarity POL and a detected voltage value DV. If the control circuit 140 determines that the AC power source P_AC is abnormal, the control circuit 140 may generate the pulse width modulation signal group S_PWM to the power conversion circuit 130 according to the detected voltage polarity POL and the detected voltage value DV, and the power conversion circuit 130 may convert the boost voltage VBST to the backup AC voltage V_AC2 according to the pulse width modulation signal group S_PWM, so that the voltage polarity and the voltage value of the backup AC voltage V_AC2 generated by the power conversion circuit 130 are in accordance with the voltage polarity and the voltage value of the power supply terminal OT. In this way, current surges can be avoided, thereby increasing the power supply stability of the power supply apparatus 100.

In an embodiment of the disclosure, in the second mode, the control circuit 140 may determine whether the AC power source P_AC returns to normal. If the control circuit 140 determines that the AC power source P_AC has returned to normal, the control circuit 140 may control the power conversion circuit 130 to stop providing the backup AC voltage V_AC2, and the control circuit 140 may turn on the first switching circuit 110 and enter the first mode.

For example, in the second mode shown in FIG. 2, the control circuit 140 may determine at the time point T3 that the AC power source P_AC does return to normal according to the main AC voltage V_AC1. Therefore, the control circuit 140 controls the power conversion circuit 130 to stop outputting the backup AC voltage V_AC2 at the time point T3. In addition, the control circuit 140 switches the first switching signal CS1 from the logic low level to the logic high level at the time point T3, so that the first switching circuit 110 switches to the on state at the time point T4 and starts outputting the main AC voltage V_AC1 as the output voltage VOUT, wherein the control circuit 140 returns to the first mode at the time point T4.

Figure 3:
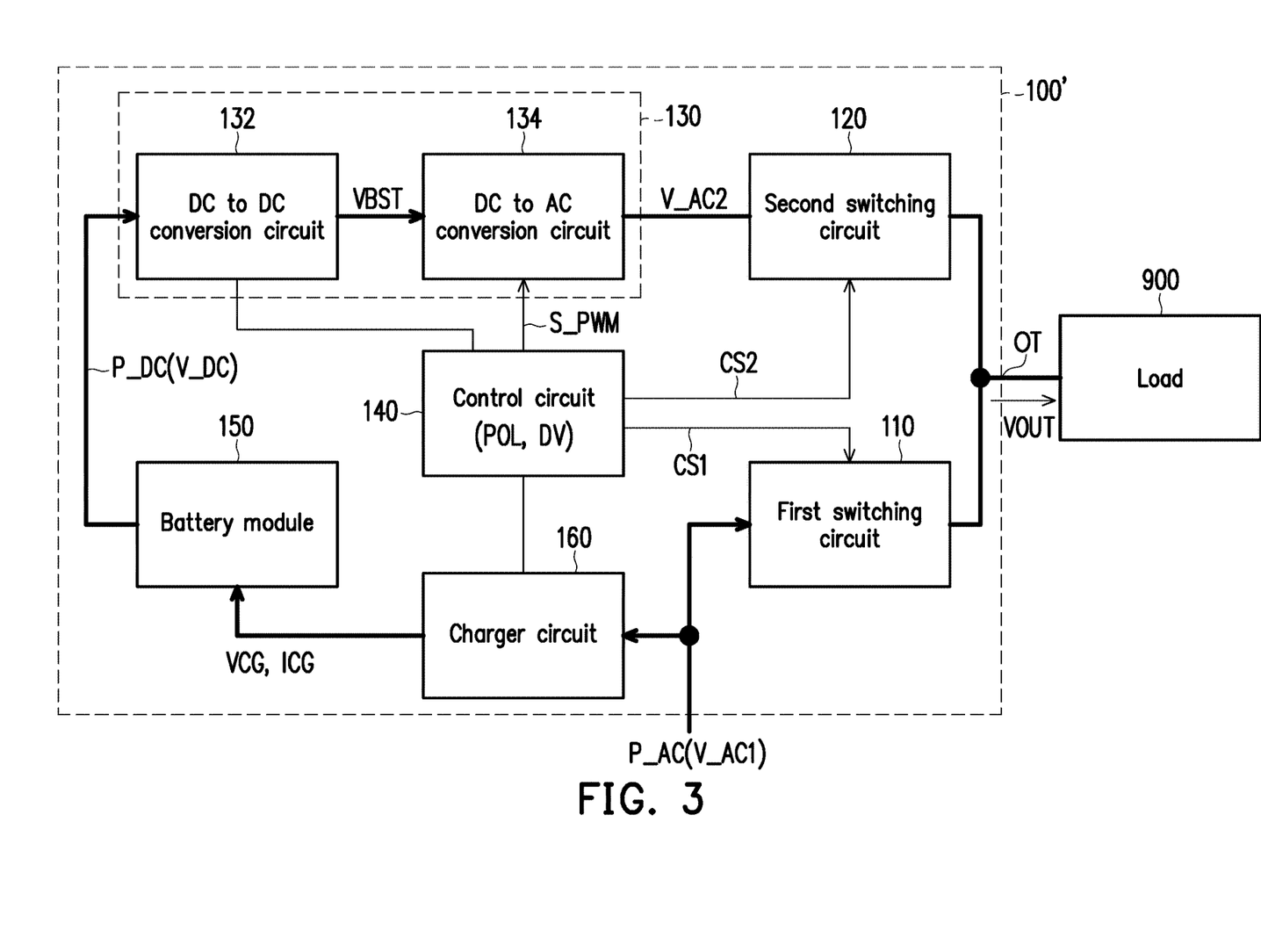
FIG. 3 is a schematic circuit block diagram of a power supply apparatus according to another embodiment of the disclosure.

FIG. 3 is a schematic circuit block diagram of a power supply apparatus 100' according to another embodiment of the disclosure. With reference to FIG. 3, the power supply apparatus 100' may include a first switching circuit 110, a second switching circuit 120, a power conversion circuit 130, a control circuit 140, a battery module 150, and a charger circuit 160, but the disclosure is not limited thereto. The operation and implementation of the first switching circuit 110, the power conversion circuit 130, and the control circuit 140 of FIG. 3 are similar to those of the first switching circuit 110, the power conversion circuit 130, and the control circuit 140 of FIG. 1, respectively; therefore, reference may be made to the above related descriptions of FIG. 1.

The second switching circuit 120 is coupled between the power conversion circuit 130 and the power supply terminal OT and is coupled to the control circuit 140. The control circuit 140 may generate a second switching signal CS2 to control the turning on and turning off of the second switching circuit 120. In particular, the control circuit 140 turns on the second switching circuit 120 before the control circuit 140 enters the first mode.

In an embodiment of the disclosure, the second switching circuit 120 may be implemented with a power transistor, but the disclosure is not limited thereto. In other embodiments of the disclosure, the second switching circuit 120 may also be implemented with other known power switches.

Since the boost voltage VBST has been established in advance by the power conversion circuit 130 according to the DC voltage V_DC before the control circuit 140 enters the first mode, and the second switching circuit 120 has been turned on before the control circuit 140 enters the first mode, when the control circuit 140 determines that the AC power source P_AC is abnormal in the first mode, the control circuit 140 only needs to turn off the first switching circuit 110 and causes the power conversion circuit 130 to convert the boost voltage VBST to the backup AC voltage V_AC2, and the backup AC voltage V_AC2 can be output to the power supply terminal OT by the second switching circuit 120 in the on state to supply power to the load 900. In this way, the switching time of the power supply source of the load 900 for switching from the AC power source P_AC to the DC power source P_DC can be shortened, thereby preventing the load 900 from failing to operate normally due to temporary interruption of the power supply.

In an embodiment of the disclosure, in the first mode, the control circuit 140 may determine whether the power conversion circuit 130 is abnormal according to the boost voltage VBST. If the control circuit 140 determines that the power conversion circuit 130 is abnormal, the control circuit 140 may turn off the second switching circuit 120 to isolate the power conversion circuit 130 from the power supply terminal OT, the load 900, and the AC power source P_AC.

In addition, the battery module 150 is configured to provide the DC power source P_DC. The charger circuit 160 is coupled between the AC power source P_AC and the battery module 150 and is controlled by the control circuit 140. The charger circuit 160 may generate a charging voltage VCG and a charging current ICG according to the AC power source P_AC to charge the battery module 150 in the first mode.

In an embodiment of the disclosure, the battery module 150 may represent a single battery (or a battery element) or a battery pack, or a module including one or a plurality of batteries (or battery elements). In addition, the battery module 150 may be a nickel-zinc battery, a nickel-hydrogen battery, a lithium ion battery, a lithium polymer battery, or a rechargeable battery such as lithium iron phosphate, but it is not limited thereto.

In an embodiment of the disclosure, the charger circuit 160 may be implemented with a conventional battery charger IC, but it is not limited thereto.

In an embodiment of the disclosure, as shown in FIG. 3, the power conversion circuit 130 may include a DC to DC conversion circuit 132 and a DC to AC conversion circuit 134. The DC to DC conversion circuit 132 is coupled to the DC power source P_DC and is configured to perform a boosting operation according to the DC voltage V_DC to generate the boost voltage VBST. The DC to AC conversion circuit 134 is coupled between the DC to DC conversion circuit 132 and the second switching circuit 120 and is controlled by the control circuit 140 to convert the boost voltage VBST to the backup AC voltage V_AC2.

In an embodiment of the disclosure, the DC to DC conversion circuit 132 may be implemented with a conventional DC boost circuit, but it is not limited thereto.

Figure 4:
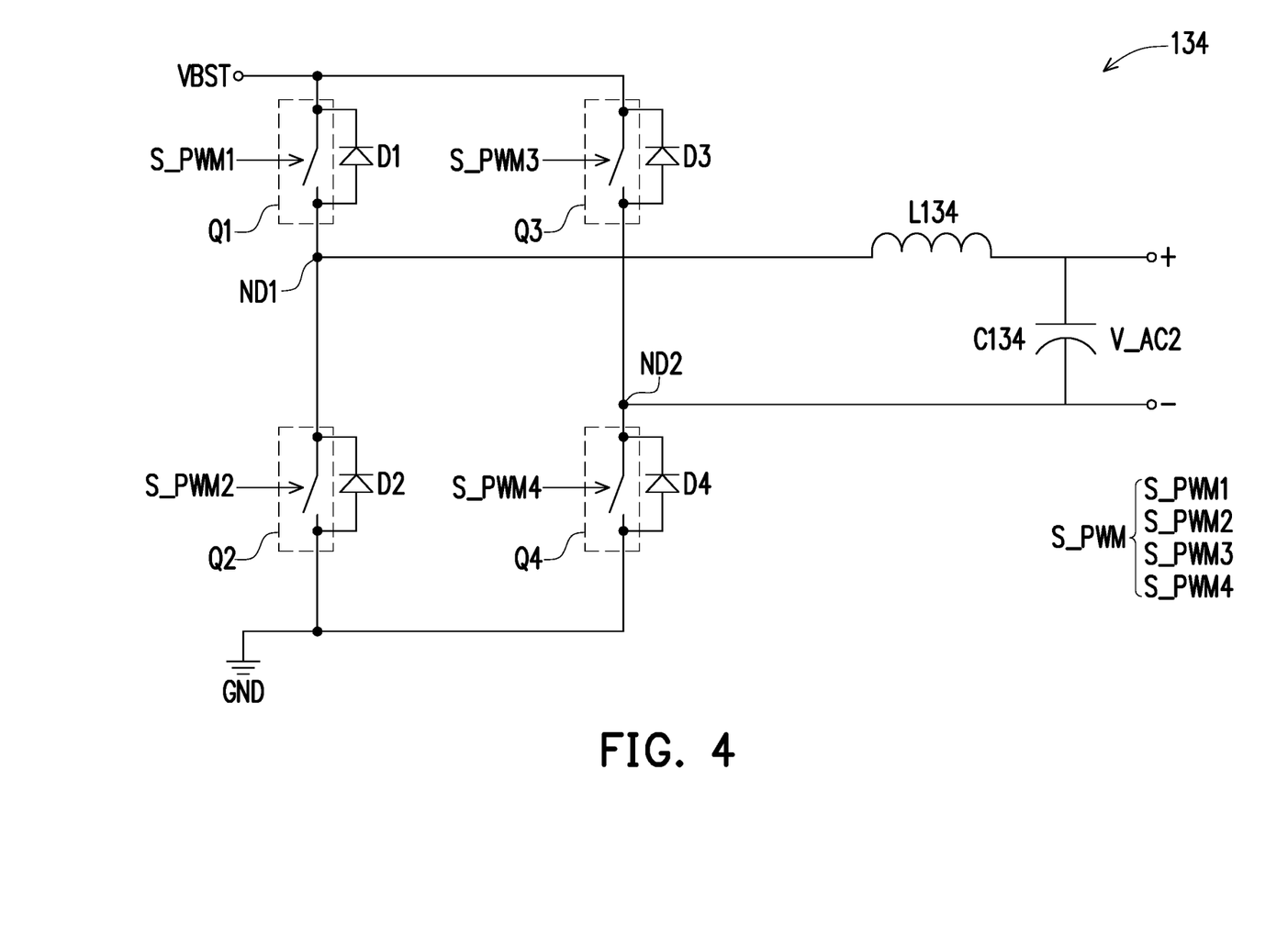
FIG. 4 is a schematic circuit structure diagram of a DC to AC conversion circuit according to an embodiment of the disclosure.

FIG. 4 is a schematic circuit structure diagram of the DC to AC conversion circuit 134 according to an embodiment of the disclosure. Please refer to FIG. 3 and FIG. 4 together. In the embodiment, the pulse width modulation signal group S_PWM may include four pulse width modulation signals S_PWM1 to S_PWM4. The DC to AC conversion circuit 134 may include switches Q1 to Q4, diodes D1 to D4, an inductor L134, and a capacitor C134, but it is not limited thereto. A first terminal of the switch Q1 is coupled to the DC to DC conversion circuit 132 to receive the boost voltage VBST. A second terminal of the switch Q1 is coupled to a first node ND1. A control terminal of the switch Q1 receives the pulse width modulation signal S_PWM1. A first terminal of the switch Q2 is coupled to the first node ND1. A second terminal of the switch Q2 is coupled to a ground terminal GND. A control terminal of the switch Q2 receives the pulse width modulation signal S_PWM2. A first terminal of the switch Q3 is coupled to the DC to DC conversion circuit 132 to receive the boost voltage VBST. A second terminal of the switch Q3 is coupled to a second node ND2. A control terminal of the switch Q3 receives the pulse width modulation signal S_PWM3. A first terminal of the switch Q4 is coupled to the second node ND2. A second terminal of the switch Q4 is coupled to the ground terminal GND. A control terminal of the switch Q4 receives the pulse width modulation signal S_PWM4.

A cathode terminal of the diode D1 is coupled to the first terminal of the switch Q1. An anode terminal of the diode D1 is coupled to the second terminal of the switch Q1. A cathode terminal of the diode D2 is coupled to the first terminal of the switch Q2. An anode terminal of the diode D2 is coupled to the second terminal of the switch Q2. A cathode terminal of the diode D3 is coupled to the first terminal of the switch Q3. An anode terminal of the diode D3 is coupled to the second terminal of the switch Q3. A cathode terminal of the diode D4 is coupled to the first terminal of the switch Q4. An anode terminal of the diode D4 is coupled to the second terminal of the switch Q4. A first terminal of the inductor L134 is coupled to the first node ND1. A second terminal of the inductor L134 is coupled to a first terminal of the capacitor C134. A second terminal of the capacitor C134 is coupled to the second node ND2. The first and second terminals of the capacitor C134 may be configured to provide the backup AC voltage V_AC2.

In detail, in the second mode, when the switches Q1 and Q4 are in the on state and the switches Q2 and Q3 are in the off state, the current flows from the switch Q1 to the switch Q4 via the inductor L134 and the capacitor C134, and therefore the capacitor C134 provides the backup AC voltage V_AC2 with the positive polarity. In the second mode, when the switches Q2 and Q3 are in the on state and the switches Q1 and Q4 are in the off state, the current flows from the switch Q3 to the switch Q2 via the capacitor C134 and the inductor L134, and therefore the capacitor C134 may provide the backup AC voltage V_AC2 with the negative polarity.

In contrast, in the first mode, the switches Q1 to Q4 are in an off state, and therefore the DC to AC conversion circuit 134 stops converting the boost voltage VBST to the backup AC voltage V_AC2. In addition, since the voltage value of the boost voltage VBST is greater than the peak value of the main AC voltage V_AC1, the diodes D1 to D4 are in reverse bias and thus are turned off in the first mode, thereby preventing the current of the AC power source P_AC from flowing into the DC to AC conversion circuit 134 through the first switching circuit 110 and the second switching circuit 120.

In an embodiment of the disclosure, in order to reduce the power supply burden of the AC power source P_AC during the peak power consumption period, during the peak power consumption period of the AC power source P_AC, the control circuit 140 may turn off the first switching circuit 110 and control the power conversion circuit 130 to convert the boost voltage VBST to the backup AC voltage V_AC2, so that the power conversion circuit 130 outputs the backup AC voltage V_AC2 to supply power to the load 900. In addition, during the off-peak power consumption period of the AC power source P_AC, power is supplied to the load 900 by the AC power source P_AC, and the battery module 150 is charged by the AC power source P_AC through the charger circuit 160.

Figure 5:
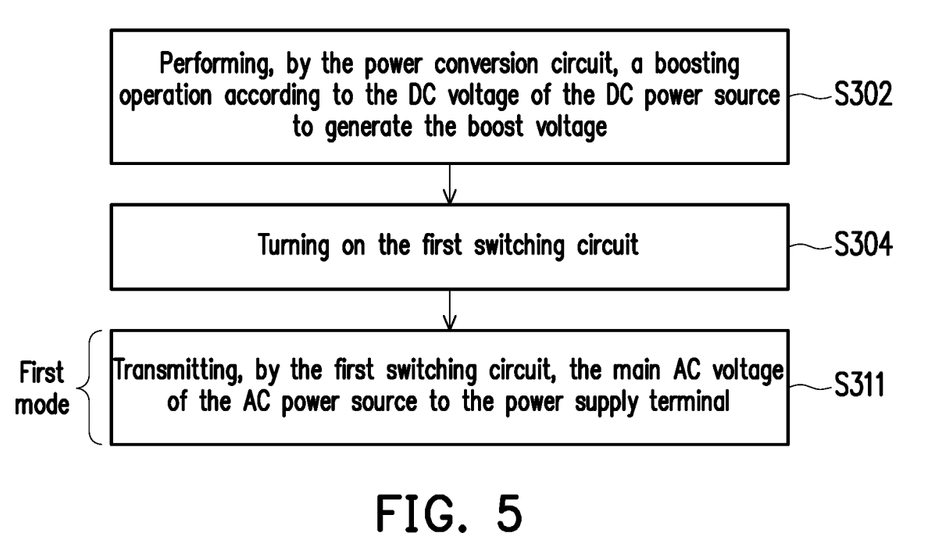
FIG. 5 is a schematic step flow chart of a power supply method according to an embodiment of the disclosure.

FIG. 5 is a schematic step flow chart of a power supply method according to an embodiment of the disclosure, which may be used in the power supply apparatus 100 of FIG. 1 or the power supply apparatus 100' of FIG. 3, but it is not limited thereto. With reference to FIG. 3 and FIG. 5 together, the power supply method of the exemplary embodiment includes the following steps. First, in step S302, a boosting operation is performed by the power conversion circuit 130 according to the DC voltage V_DC of the DC power source P_DC to generate the boost voltage VBST. Next, in step S304, the first switching circuit 110 is turned on by the control circuit 140, and the first mode is entered. Then, in the first mode, the main AC voltage V_AC1 of the AC power source P_AC is transmitted to the power supply terminal OT by the first switching circuit 110, as shown in step S311, wherein the voltage value of the boost voltage VBST is greater than the peak value of the main AC voltage V_AC1.

Figure 6A:
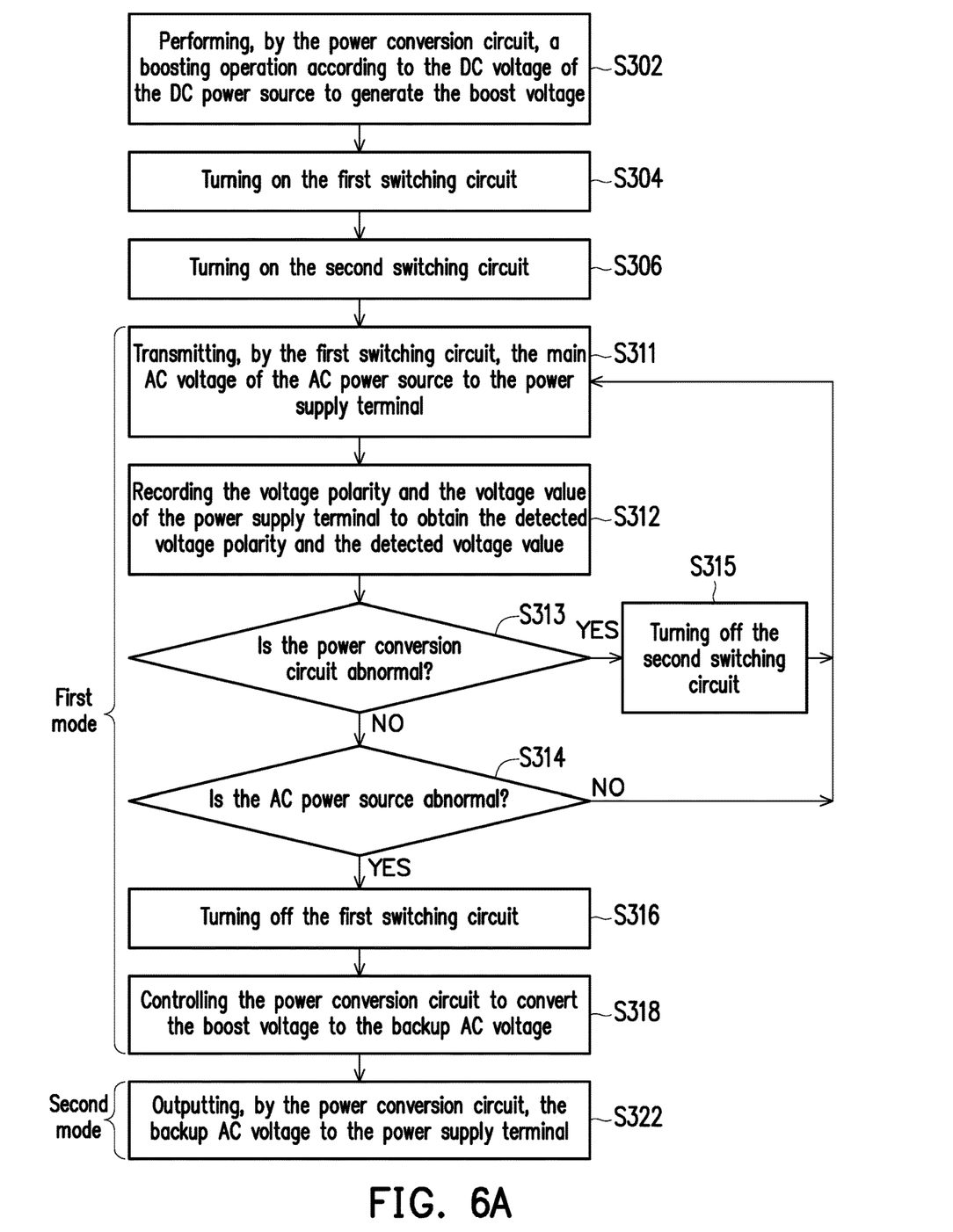
FIGS. 6A and 6B are a schematic step flow chart of a power supply method according to another embodiment of the disclosure.
Figure 6B:
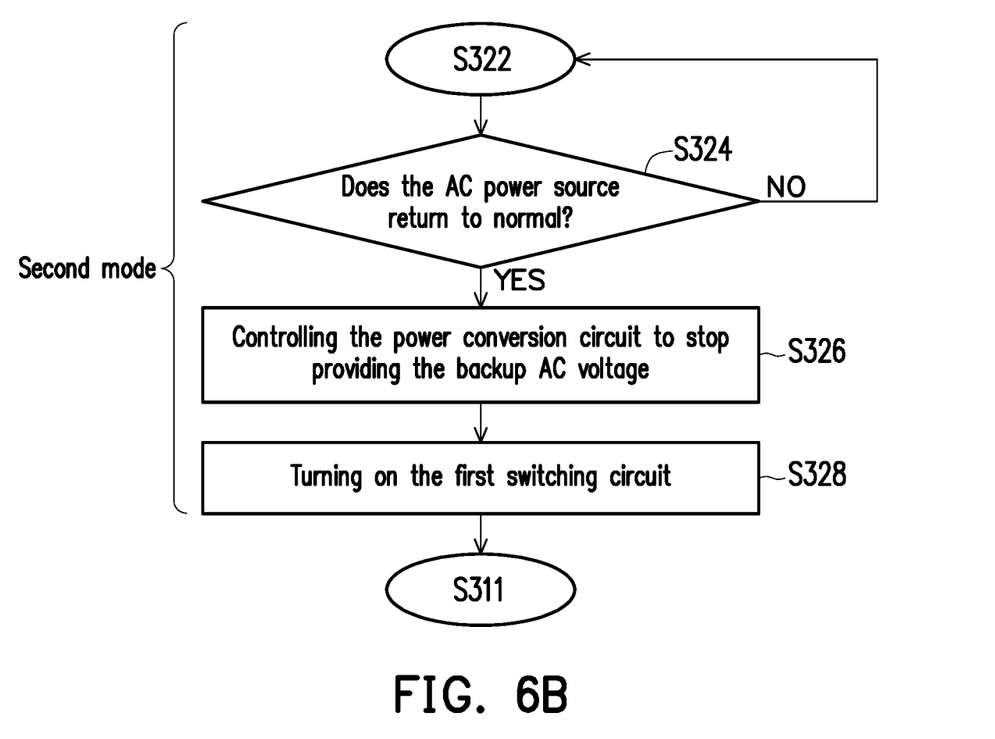

FIGS. 6A and 6B are a schematic step flow chart of a power supply method according to another embodiment of the disclosure. Please refer to FIG. 3, FIG. 6A and FIG. 6B together. First, in step S302, a boosting operation is performed by the power conversion circuit 130 according to the DC voltage V_DC of the DC power source P_DC to generate the boost voltage VBST. In an embodiment of the disclosure, before step S302, the control circuit 140 may check whether the first switching circuit 110 is short-circuited according to the main AC voltage V_AC1 and the voltage of the power supply terminal OT. For example, the control circuit 140 may first provide the first switching signal CS1 to turn off the first switching circuit 110 and then detect whether the voltage of the power supply terminal OT is equal to the main AC voltage V_AC1. If the voltage of the power supply terminal OT is equal to the main AC voltage V_AC1, it indicates that the first switching circuit 110 is short-circuited, and thus the control circuit 140 may issue a fault warning message. In contrast, if the voltage of the power supply terminal OT is not equal to the main AC voltage V_AC1, it indicates that the first switching circuit 110 is not short-circuited, and the control circuit 140 performs step S302.

Next, in step S304, the first switching circuit 110 is turned on by the control circuit 140. In an embodiment of the disclosure, after the control circuit 140 turns on the first switching circuit 110, the control circuit 140 may check whether the first switching circuit 110 is open-circuited according to the main AC voltage V_AC1 and the voltage of the power supply terminal OT. In detail, if the voltage of the power supply terminal OT is not equal to the main AC voltage V_AC1, it indicates that the first switching circuit 110 is open-circuited, and thus the control circuit 140 may issue a fault warning message. In contrast, if the voltage of the power supply terminal OT is equal to the main AC voltage V_AC1, it indicates that the first switching circuit 110 is not open-circuited.

In an embodiment of the disclosure, after the control circuit 140 turns on the first switching circuit 110, the control circuit 140 may check whether the second switching circuit 120 is short-circuited according to the voltage of the power supply terminal OT and the voltage of the output terminal of the power conversion circuit 130. For example, the control circuit 140 may first provide the second switching signal CS2 to turn off the second switching circuit 120 and then detect whether the voltage of the output terminal of the power conversion circuit 130 is equal to the voltage of the power supply terminal OT. If the voltage of the output terminal of the power conversion circuit 130 is equal to the voltage of the power supply terminal OT, it indicates that the second switching circuit 120 is short-circuited, and thus the control circuit 140 may issue a fault warning message. In contrast, if the voltage of the output terminal of the power conversion circuit 130 is not equal to the voltage of the power supply terminal OT, it indicates that the second switching circuit 120 is not short-circuited, and the control circuit 140 performs step S306. In step S306, the second switching circuit 120 is turned on by the control circuit 140, and the first mode is entered.

Thereafter, in the first mode, the main AC voltage V_AC1 of the AC power source P_AC is transmitted to the power supply terminal OT by the first switching circuit 110, as shown in step S311. Next, in step S312, the voltage polarity and the voltage value of the power supply terminal OT are recorded by the control circuit 140 to obtain the detected voltage polarity POL and the detected voltage value DV. Thereafter, in step S313, it is determined by the control circuit 140 whether the power conversion circuit 130 is abnormal. If the determination result in step S313 is YES, the second switching circuit 120 is turned off by the control circuit 140, as shown in step S315, and the process returns to step S311 after step S315. If the determination result in step S313 is NO, it is determined by the control circuit 140 whether the AC power source P_AC is abnormal, as shown in step S314. If the determination result in step S314 is NO, the process returns to step S311. If the determination result in step S314 is YES, the first switching circuit 110 is turned off by the control circuit 140, as shown in step S316. Next, in step S318, the power conversion circuit 130 is controlled by the control circuit 140 to convert the boost voltage VBST to the backup AC voltage V_AC2, and the second mode is entered. Then, in the second mode, the backup AC voltage V_AC2 is output to the power supply terminal OT by the power conversion circuit 130 to supply power to the load 900, as shown in step S322.

Next, in step S324 shown in FIG. 6B, in the second mode, it is determined by the control circuit 140 whether the AC power source P_AC returns to normal. If the determination result in step S324 is NO, the process returns to step S322, and the power conversion circuit 130 outputs the backup AC voltage V_AC2 to the power supply terminal OT. If the determination result in step S324 is YES, the power conversion circuit 130 is controlled by the control circuit 140 to stop providing the backup AC voltage V_AC2, as shown in step S326. Next, in step S328, the first switching circuit 110 is turned on by the control circuit 140, and the first mode is entered. Thereafter, the process returns to step S311, and the first switching circuit 110 transmits the main AC voltage V_AC1 of the AC power source P_AC to the power supply terminal OT to supply power to the load 900.

Figure 7:
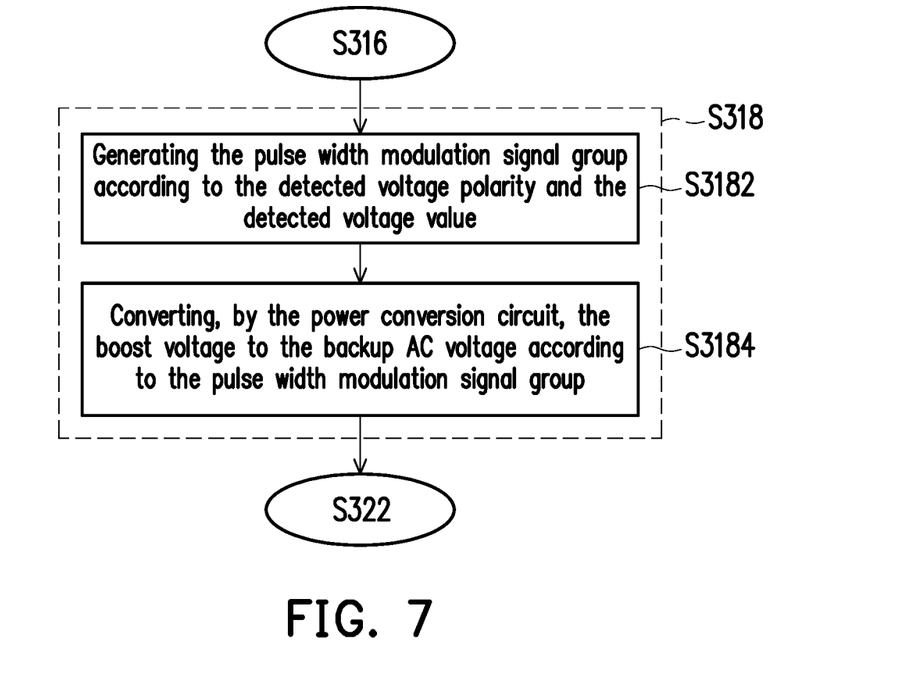
FIG. 7 is a flow chart of the detailed steps of step S318 of FIG. 6 according to an embodiment of the disclosure.

FIG. 7 is a flow chart of the detailed steps of step S318 of FIG. 6 according to an embodiment of the disclosure. Please refer to FIG. 3 and FIG. 7 together. Step S318 includes detailed steps S3182 and S3184. First, in step S3182, the pulse width modulation signal group S_PWM is generated by the control circuit 140 according to the detected voltage polarity POL and the detected voltage value DV. Next, in step S3184, the boost voltage VBST is converted to the backup AC voltage V_AC2 by the power conversion circuit 130 according to the pulse width modulation signal group S_PWM.

In addition, the description of the embodiments of FIG. 1 to FIG. 4 can provide sufficient teaching, suggestion and implementation directions for other details of the power supply method of the embodiment of the disclosure; therefore, the details will not be repeated again.

In summary, in the power supply apparatus and the power supply method according to the embodiments of the disclosure, before the control circuit enters the first mode, the power conversion circuit generates the boost voltage in advance according to the DC voltage of the DC power source. In this way, when the control circuit determines that the AC power source for supplying power to the load is abnormal in the first mode, the control circuit only needs to turn off the first switching circuit and causes the power conversion circuit to convert the boost voltage to the backup AC voltage, and then the backup AC voltage can be output to supply power to the load. Therefore, the switching time of the power supply source of the load for switching from the AC power source to the DC power source can be shortened, thereby preventing the load from failing to operate normally due to temporary interruption of the power supply.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A power supply apparatus, comprising:
   a power conversion circuit coupled between a DC power source and a power supply terminal and configured to perform a boosting operation according to a DC voltage of the DC power source to generate a boost voltage;
   a first switching circuit coupled between an AC power source and the power supply terminal;
   a second switching circuit coupled between the power conversion circuit and the power supply terminal; and
   a control circuit coupled to the power conversion circuit, the first switching circuit and the second switching circuit, wherein the control circuit enters a first mode after turning on the first switching circuit and the second switching circuit, so that the first switching circuit transmits a main AC voltage of the AC power source to the power supply terminal in the first mode, and the boost voltage has been established in advance by the power conversion circuit according to the DC voltage before the control circuit enters the first mode,
   wherein a voltage value of the boost voltage is greater than a peak value of the main AC voltage.

2. The power supply apparatus according to claim 1, wherein
   in the first mode, the control circuit determines whether the power conversion circuit is abnormal, and if the control circuit determines that the power conversion circuit is abnormal, the control circuit turns off the second switching circuit.

3. The power supply apparatus according to claim 1, wherein the control circuit determines whether the AC power source is abnormal in the first mode, and if the AC power source is abnormal, the control circuit turns off the first switching circuit, and the control circuit controls the power conversion circuit to convert the boost voltage to a backup AC voltage and enters a second mode, so that the power conversion circuit outputs the backup AC voltage to the power supply terminal in the second mode.

4. The power supply apparatus according to claim 3, wherein the power conversion circuit comprises:
   a DC to DC conversion circuit coupled to the DC power source and configured to perform the boosting operation according to the DC voltage to generate the boost voltage; and
   a DC to AC conversion circuit coupled between the DC to DC conversion circuit and the second switching circuit and configured to be controlled by the control circuit to convert the boost voltage to the backup AC voltage.

5. The power supply apparatus according to claim 3, wherein
   in the first mode, the control circuit records a voltage polarity and a voltage value of the power supply terminal to obtain a detected voltage polarity and a detected voltage value,
   wherein if the control circuit determines that the AC power source is abnoiiiial, the control circuit generates a pulse width modulation signal group according to the detected voltage polarity and the detected voltage value, and the power conversion circuit converts the boost voltage to the backup AC voltage according to the pulse width modulation signal group.

6. The power supply apparatus according to claim 3, wherein
   in the second mode, the control circuit determines whether the AC power source returns to normal, and if the AC power source returns to normal, the control circuit controls the power conversion circuit to stop providing the backup AC voltage, turns on the first switching circuit and enters the first mode.

7. The power supply apparatus according to claim 1, further comprising:

a battery module configured to provide the DC power source; and a charger circuit coupled between the AC power source and the battery module and being controlled by the control circuit, wherein the charger circuit generates a charging voltage and a charging current according to the AC power source to charge the battery module in the first mode.

8. A power supply method, comprising:

performing, by a power conversion circuit, a boosting operation according to a DC voltage of a DC power source to generate a boost voltage;

turning on, by a control circuit, a first switching circuit coupled between an AC power source and a power supply terminal;

after the first switching circuit is turned on, turning on, by the control circuit, a second switching circuit coupled between the power conversion circuit and the power supply terminal and entering a first mode; and in the first mode, transmitting, by the first switching circuit, a main AC voltage of the AC power source to the power supply terminal, wherein before the control circuit enters the first mode, the boost voltage has been established in advance by the power conversion circuit according to the DC voltage, wherein a voltage value of the boost voltage is greater than a peak value of the main AC voltage.

9. The power supply method according to claim 8, further comprising:

in the first mode, determining by the control circuit whether the power conversion circuit is abnormal to obtain a determination result; and if the determination result is YES, turning off the second switching circuit by the control circuit.

10. The power supply method according to claim 8, further comprising:

in the first mode, determining by the control circuit whether the AC power source is abnormal to obtain a first determination result;

if the first determination result is YES, turning off the first switching circuit and controlling the power conversion circuit to convert the boost voltage to a backup AC voltage by the control circuit and entering a second mode; and in the second mode, outputting, by the power conversion circuit, the backup AC voltage to the power supply terminal.

11. The power supply method according to claim 10, further comprising:

in the first mode, recording, by the control circuit, a voltage polarity and a voltage value of the power supply terminal to obtain a detected voltage polarity and a detected voltage value.

12. The power supply method according to claim 11, wherein a step of controlling the power conversion circuit to convert the boost voltage to the backup AC voltage comprises:

generating, by the control circuit, a pulse width modulation signal group according to the detected voltage polarity and the detected voltage value; and converting, by the power conversion circuit, the boost voltage to the backup AC voltage according to the pulse width modulation signal group.

13. The power supply method according to claim 10, further comprising:

in the second mode, determining by the control circuit whether the AC power source returns to normal to obtain a second determination result; and if the second determination result is YES, controlling the power conversion circuit to stop providing the backup AC voltage and turning on the first switching circuit by the control circuit and entering the first mode.

14. The power supply method according to claim 8, further comprising:

providing the DC power source by a battery module; and generating, by a charger circuit, a charging voltage and a charging current according to the AC power source to charge the battery module in the first mode.

* * * * *